J. B. WOODWORTH.
VALVE.
APPLICATION FILED NOV. 19, 1909.

1,055,117.

Patented Mar. 4, 1913.

WITNESSES:
Chas. H. Young
S. Davis

INVENTOR
John B. Woodworth
BY
Parsons, Hall & Bodell
ATTORNEYS

UNITED STATES PATENT OFFICE.

JOHN B. WOODWORTH, OF SYRACUSE, NEW YORK, ASSIGNOR TO THE SYRACUSE FAUCET & VALVE COMPANY, OF SYRACUSE, NEW YORK, A CORPORATION OF NEW YORK.

VALVE.

1,055,117.      Specification of Letters Patent.      Patented Mar. 4, 1913.

Application filed November 19, 1909. Serial No. 528,872.

*To all whom it may concern:*

Be it known that I, JOHN B. WOODWORTH, of Syracuse, in the county of Onondaga and State of New York, have invented a certain new and useful Valve, of which the following is a specification.

My invention relates to valves and particularly to means for preventing leakage along the valve stem, and to means for opening and closing the valve; and it consists in the combinations and constructions hereinafter set forth and claimed.

In describing this invention, reference is had to the accompanying drawing in which like characters designate corresponding parts in all the views.

Figure 1:
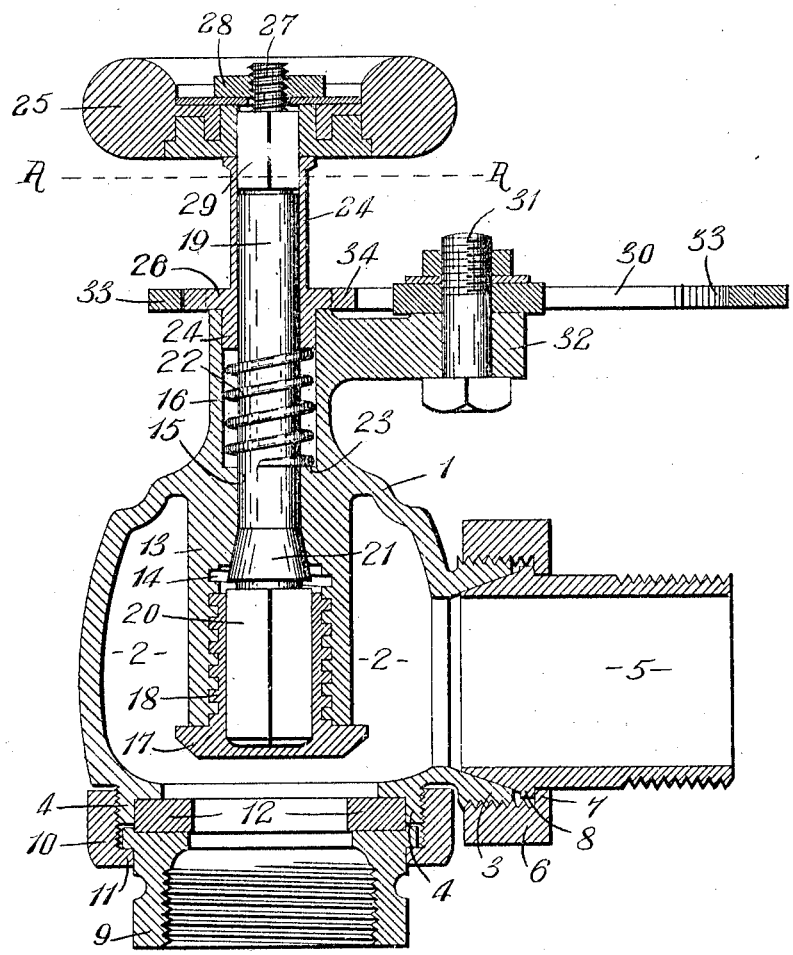
Figure 2:
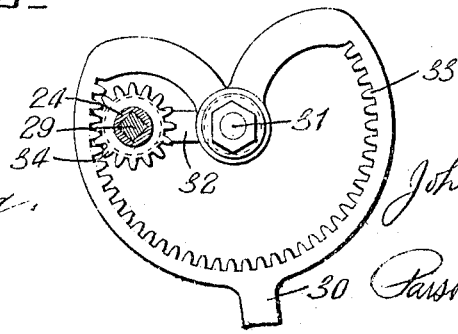

Figure 1 is a vertical section, partly in elevation, of my valve. Fig. 2 is a section on line A—A, Fig. 1, parts being omitted.

1 is the body or casing of this valve; the body inclosing a receiving chamber 2, and being provided with externally-threaded nipples 3 and 4 to which are connected respectively the inlet and outlet pipe connections. The inlet pipe connection 5 is provided with a tapered end which enters a conical passage of the nipple 3, and said pipe 5 is secured to the nipple 3 by an internally-threaded coupling sleeve 6 which turns on the nipple 3 and is provided with an inturned shoulder 7 for engaging a peripheral shoulder 8 on the inlet pipe connection. The outlet pipe connection 9 is secured in position by a coupling sleeve 10 similar to the sleeve 6, the sleeve 10 turning on the nipple 4 and having an inturned shoulder 11 engaging a peripheral shoulder on the connection 9. The connection 9 and the body 1 are formed with opposing annular surfaces between which is clamped a valve seat ring 12. The body 1 is also provided with an inwardly extending boss 13 having a threaded socket 14 disposed coaxially with the valve seat and outlet pipe connection 9 and with a passage 15 opening through the inner end of the socket and extending outwardly through the body and through a neck 16 forming part of the body, the outer portion of the passage within the neck being enlarged. The inner end of the passage 15 opening into the socket is also enlarged and is preferably formed conical.

17 is a valve head movable toward and from the seat 12; said valve head being formed with an externally-threaded shank 18 turning in the threaded socket 14.

19 is a stem connected to the valve head for moving the same toward the valve seat, the stem being non-movable axially with the valve head, and one of the parts 17, 19 here shown as the valve head, being provided with a non-circular or square socket which receives a similarly shaped part 20 of the other part, as the stem 19. Thus the stem 19 is slidably connected to the valve head 17. In order to prevent any fluid that might find its way into the socket 14 from working along the stem and out of the body, the stem is provided with a conical enlargement 21 which fits the conical portion of the inner end of the passage 15, and this conical enlargement 21 is held to snugly fit the walls of the passage by a spring 22 encircling the stem within the enlarged outer portion of the passage 15 within the neck 16 and pressing the stem outwardly. The spring 22 abuts against the inner end wall 23 of the enlarged portion of the passage within the neck 16 and presses upwardly against the end of sleeve 24 encircling the projecting end of the stem and extending into and journaled within the neck 16. Said sleeve at its upper or outer end abuts against a collar forming part of a handle 25 mounted on the stem, and the sleeve is provided near its lower end with a peripheral flange 26 for engaging the upper end of the neck 16 and thereby preventing the sleeve from entering too far into the neck 16. The stem is provided with a threaded extremity 27 extending above the handle and on which turns a nut 28 against the upper face of the handle, the handle being capable of movement axially on the stem, so that when the nut 28 is turned on the threaded end of the stem it forces the sleeve downwardly against the spring 22, and said spring presses the sleeve and stem outwardly and thus takes up any wear of the conical enlargement 21 of the stem and the contiguous walls of the conical portion of the passage 15. Preferably the stem is formed with a non-circular or squared portion 29 for connecting the handle and the stem, this squared portion also fitting a similarly shaped opening in the upper end of the sleeve 24 in order that the sleeve may rotate with the stem, or the stem rotate with the sleeve as hereinafter set forth.

The valve is preferably provided with means for operating the valve head independently of the ordinary handle 25, said means comprising a member carried by the body and here shown as a foot lever 30 pivoted eccentric to the stem at 31 to an arm 32 extending outwardly from the neck 16, this lever having its pivotal axis parallel to the axis of the stem 19, and said lever having a toothed rack 33 meshing with a gear connected to the stem. As here shown the flange of the sleeve 24 is provided with peripheral gear teeth 34 which are disposed external to the casing and between the opposite annular surfaces of the sleeve 24 for coacting with the opposing annular surfaces of the neck 16 and the collar forming part of the handle 25, said gear teeth 34 meshing with the rack 33. Obviously movement of the foot lever on its pivot operates to turn the sleeve and rotate the valve stem therewith.

What I claim is:—

1. A valve comprising a body having a valve seat associated therewith, said body being formed with a passage, a valve head movable toward and from the seat, a rotatable stem located in the passage and slidably connected to the valve head, a sleeve journaled in the body and rotatable with the stem, means directly connected to the sleeve for moving the sleeve about its axis and rotating the stem, and an operating member separable from the sleeve and coacting directly with the stem for rotating said stem, substantially as and for the purpose described.

2. A valve comprising a body having a valve seat associated therewith, said body being formed with a passage, a valve head movable toward and from the seat, a rotatable stem located in the passage and having one end slidably connected to the valve head, and its other end extending outside of the body, a collar on the outer end of the stem, and a sleeve encircling the stem and nonrotatable thereon, said sleeve being journaled in the outer end of the passage and having opposite annular surfaces for engaging opposing annular surfaces of the body and the collar, said sleeve having the portion of its periphery between said opposite annular surfaces provided with engaging means external to the casing, substantially as and for the purpose specified.

3. A valve comprising a body having a valve seat associated therewith, said body being formed with a passage having an enlarged portion at its inner end, and an outer enlarged portion opening through the outer face of the body, a valve head movable toward and from the seat, a rotatable stem located in the passage and slidably connected to the valve head and extending outside of the body, the stem being non-movable endwise and having an enlargement fitting the enlarged portion at the inner end of the passage, a collar on the outer portion of the stem, a sleeve encircling the stem and nonrotatable thereon and interposed between the body and the collar, the sleeve having a flange for engaging the surface of the body around the outer end of said passage, and a spring coiled about the stem within the outer enlarged portion of the passage and pressing outwardly on the sleeve, substantially as and for the purpose set forth.

4. A valve comprising a one piece metal body having a valve seat associated therewith, said body being formed with a central inwardly extending boss formed with a socket opening inwardly and opposed to the valve seat, the body being also formed with an integral outwardly extending neck having a passage opening through the end wall of the socket, the passage having enlargements at its inner and outer ends, a valve head movable toward and from the seat and having a shank engaging the walls of the socket, a stem extending through said passage and having a portion at its inner end slidably engaging the shank of the valve head whereby when the stem is turned the valve head is moved toward and from the valve seat, the stem having an enlargement fitting the enlargement at the inner end of the passage, and the stem projecting beyond the outer end of the neck, a sleeve encircling the outer projecting portion of the stem and engaging the end of the neck, a collar on the outer end of the stem and nonrotatable thereon, the collar bearing against the outer end of the sleeve and a spring coiled about the stem and located within the enlargement of the passage at the outer end of the neck and bearing at one end against the opposing end of the sleeve and at the other end against said end wall of the socket, substantially as and for the purpose specified.

5. A valve comprising a body having a valve seat associated therewith, said body being formed with a passage having an enlarged conical portion at its inner end and an outer enlarged portion opening through the outer face of the body, a valve head movable toward and from the seat, a stem located in the passage and slidably connected to the valve head and extending outside of the body, the stem being non-movable endwise and having a conical enlargement fitting the conical portion of the passage, the outer extremity of the stem being threaded, a collar on the outer portion of the stem, the collar being capable of movement axially of the stem, a sleeve encircling the stem and rotatable therewith and interposed between the body and the collar, the sleeve extending partly into the outer enlarged portion of said passage and having a flange engaging the surface of the body around the outer end of said passage, a nut turning on the threaded end of the stem against the collar, and a spring coiled about the stem within the outer enlarged portion of the passage and pressing outwardly on the sleeve, substantially as and for the purpose specified.

6. A valve comprising a body having a valve seat associated therewith, said body being formed with a passage, a valve head movable toward and from the seat, a rotatable stem located in the passage and having one end slidably connected to the valve head, and its other end extending outside of the body, a collar on the outer end of the stem, a sleeve encircling the stem and non-rotatable thereon, said sleeve being journaled in the outer end of the passage and having opposite annular surfaces for engaging opposing annular surfaces of the body and the collar, said collar and sleeve having non-circular openings for receiving the stem, and the stem having a non-circular portion at its outer extremity for coacting with said non-circular openings of the collar and the sleeve, and means coacting with the outer end of the stem and the collar for effecting relative axial movement between the stem and said collar and sleeve, substantially as and for the purpose described.

7. A valve comprising a body having a valve seat associated therewith, said body being formed with a passage, a rotatable valve head movable toward and from the seat, a rotatable stem located in the passage and having one end slidably connected to the valve head, and its other end extending outside of the body, a collar on the outer end of the stem, a sleeve encircling the stem and non-rotatable thereon, said sleeve being journaled in the outer end of the passage and having opposite annular surfaces engaging opposing annular surfaces on the body and the collar, and a member carried by the body and provided with means coacting with the sleeve for rotating the same, substantially as and for the purpose specified.

8. A valve comprising a body having a valve seat associated therewith, said body being formed with a passage having an enlarged portion at its inner end, and an outer enlarged portion opening through the outer face of the body, a rotatable valve head movable toward and from the seat, a rotatable stem located in the passage and slidably connected to the valve head, and extending outside of the body, the stem being non-movable endwise and having an enlargement fitting the enlarged portion at the inner end of the passage, a collar on the outer portion of the stem, a sleeve encircling the stem and non-rotatable thereon, and interposed between the body and the collar, the sleeve having a flange engaging the surface of the body around the outer end of said passage, a spring coiled about the stem within the outer enlarged portion of the passage and pressing outwardly on the sleeve, and a member carried by the body and provided with means coacting with the sleeve for rotating the same, substantially as and for the purpose set forth.

9. A valve comprising a body having a valve seat associated therewith, a rotatable valve head movable toward and from the seat, a stem connected to the valve head and extending outside of the body and having its outer extremity threaded, a collar provided on the outer portion of the stem, the collar being capable of movement axially of the stem, a sleeve encircling the stem and interposed between the body and the collar, the sleeve being rotatable with the stem and provided with a gear wheel, a nut turning on the threaded extremity of the stem against the collar, and a member carried by the body and provided with gear teeth for meshing with the gear wheel, substantially as and for the purpose specified.

10. A valve comprising a body having a valve seat associated therewith, said body being formed with a passage having an enlarged conical portion at its inner end, a valve head movable toward and from the seat, a stem located in the passage and slidably connected to the valve head and extending outside of the body, the stem having a conical enlargement fitting the enlarged portion of the passage, the extremity of the stem being threaded, a collar on the outer portion of the stem, the collar being capable of movement axially of the stem, a sleeve encircling the stem and interposed between the body and the collar, the sleeve being rotatable with the stem, a nut turning on the threaded end of the stem against the collar, a gear wheel provided on the sleeve, and a member carried by the body and provided with gear teeth for meshing with the gear wheel, substantially as and for the purpose described.

11. A valve comprising a body having a valve seat associated therewith, a rotatable valve head movable toward and from the seat, a stem connected to the valve head and extending outside of the body and having its outer extremity threaded, a collar provided on the outer portion of the stem, the collar being capable of movement axially of the stem, a sleeve encircling the stem and interposed between the body and the collar, the sleeve being rotatable with the stem and provided with a gear wheel, a nut turning on the threaded extremity of the stem against the collar, and a lever pivoted to the body and provided with gear teeth for meshing with the gear wheel, substantially as and for the purpose described.

12. A valve comprising a body having a valve seat associated therewith, said body being formed with a passage having an enlarged conical portion at its inner end, a valve head movable toward and from the seat, a stem located in the passage slidably connected to the valve head and extending outside of the body, the stem having a conical enlargement fitting the enlarged portion of the passage, the extremity of the stem being threaded, a collar on the outer portion of the stem the collar being capable of movement axially of the stem, a sleeve encircling the stem and interposed between the body and the collar, the sleeve being rotatable with the stem, a nut turning on the threaded end of the stem against the collar, a gear wheel provided on the sleeve, and a lever pivoted to the body and provided with gear teeth for meshing with the gear wheel, substantially as and for the purpose set forth.

13. A valve comprising a body having a valve seat associated therewith, the body being formed with a threaded socket opposed to the seat and with a passage arranged axially with the socket, the passage having an enlarged conical portion opening into the socket and also an enlarged portion opening through the outer surface of the body, a valve head movable toward and from the seat and having a threaded shank turning in the socket, means for turning the valve head including a stem located in the passage and slidably connected to the valve head, one of the connected parts being formed with a non-circular axial socket and the other of said parts having a portion slidably fitting the non-circular socket, the stem being formed with a conical enlargement fitting the conical portion of the passage, and the outer extremity thereof being threaded, a collar on the outer end of the stem, the collar being capable of movement axially of the stem, a sleeve encircling the stem and being interposed between the body and the collar, the sleeve being rotatable with the stem and extending into the outer enlarged portion of said passage and having a peripheral flange engaging the outer end of the body around said passage, the flange being formed with gear teeth, and a lever pivoted to the body eccentric to the stem and being provided with gear teeth for meshing with the gear teeth of the sleeve, and a spring located in the outer enlarged portion of the passage and pressing upwardly on the inner end of the sleeve, substantially as and for the purpose specified.

In testimony whereof, I have hereunto signed my name in the presence of two attesting witnesses, at Syracuse, in the county of Onondaga, in the State of New York, this 13th day of October, 1909.

JOHN B. WOODWORTH.

Witnesses:
S. DAVIS,
E. K. SEEMILLER.